Patented Mar. 26, 1946

2,397,425

UNITED STATES PATENT OFFICE 2,397,425

PROCESS OF PREPARING SEX HORMONES

Russell Earl Marker, State College, Pa., and Eugene L. Wittle, Detroit, Mich., assignors to Parke, Davis & Company, Detroit, Mich., a corporation of Michigan No Drawing. Original application October 25, 1940, Serial No. 362,836. Divided and this application December 2, 1943, Serial No. 512,602

6 Claims. (Cl. 260—397.3)

This invention relates to a process of preparing sex hormones, and more particularly, to a new and improved process for the preparation of steroidal hormones from sterols and bile acids.

This application is a division of our copending application, Serial No. 362,836, filed October 25, 1940.

One object of this invention is to afford a process whereby compounds simply convertible into sex hormones can be prepared from sterols or bile acids in improved yields.

Another object of this invention is to afford a simplified process for the preparation of compounds simply convertible into sex hormones.

Yet another object of this invention is to afford a new process for the preparation of $\Delta^4$-3-keto steroids such as the sex hormones from $\Delta^4$-unsaturated steroids.

Other objects will become apparent on perusal of this specification and the appended claims.

We have developed a process in which the oxidation proceeds in good yields to give intermediates which can be converted simply and in good yields to the sex hormones.

Our process consists essentially in treating a steroid of the formula,

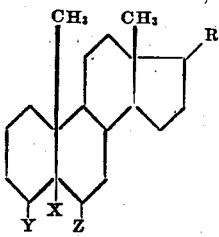

where R is a member of the group consisting of hydrocarbon radicals and oxygenated hydrocarbon radicals, X is a halogen, and one of Y and Z is a member of the group consisting of hydrogen and halogen, the other being hydrogen, with an agent capable of oxidatively rupturing carbon-to-carbon bonds of the group R, treating the oxidation products having a shortened side-chain thus obtained to obtain the corresponding $\Delta^4$-unsaturated steroids, and treating these with an agent capable of oxidizing a methylene group adjacent to a double bond thus forming the corresponding 3-keto $\Delta^4$-unsaturated steroids having a shortened side-chain.

In greater detail, our new process consists first in forming a $\Delta^4$- or $\Delta^5$-unsaturated sterol or bile acid derivative. Because of their availability, we prefer to use as starting materials, the naturally occurring sterols in which the side-chain R is a hydrocarbon radical containing 8 to 10 carbon atoms. This side-chain may be saturated, as in cholesterol $C_8H_{17}$ or sitosterol $C_{10}H_{21}$, or it may be unsaturated as in ergosterol $C_9H_{17}$. Sterols of this type are readily converted into the corresponding 3-desoxy compounds, i. e. into the $\Delta^4$ or $\Delta^5$-unsaturated hydrocarbons. Thus cholesterol may be distilled at atmospheric pressure to give $\Delta^4$-cholestene, or it may be treated with phosphorous pentachloride or thionyl chloride to form cholesteryl chloride, and the latter reduced as for example with sodium and amyl alcohol to yield $\Delta^5$-cholestene.

The $\Delta^4$ or $\Delta^5$-unsaturated steroidal hydrocarbon used as a starting material is first treated with halogen or hydrohalic acid to add the elements of these substances to the steroidal double bond. We prefer to use chlorine, bromine, hydrogen chloride or hydrogen bromide in this step. The compound thus obtained has a halogen atom attached to $C_5$ and another halogen atom or hydrogen atom, depending upon whether halogen or hydrohalic acid was added, is attached to the other carbon atom of the original double bond.

The dihalide or hydrohalide addition product thus obtained is then oxidized under conditions sufficiently vigorous to rupture carbon-to-carbon bonds. While a variety of agents may be employed for this purpose, we prefer to use chromic acid, permanganic acid or their salts and we find it most convenient to conduct the oxidation in acetic acid below 100° C. and preferably at 35–60° C.

After the oxidation has been completed, the products are separated so as to recover any starting material and then the oxidation product consisting of a mixture of steroids having shortened, oxygenated side-chain is separated into its components according to several possible methods. It is convenient to remove the elements of halogen or hydrohalic acid at this point by treatment with a dehalogenating or dehydrohalogenating agent. Suitable dehalogenating agents include sodium iodide, zinc and acetic acid, metallic magnesium, and the like, and suitable dehydrohalogenating agents are basic substances such as pyridine, sodium acetate and other alkali metal salts of carboxylic acids, and the like.

If a $\Delta^4$-unsaturated steroid has been used as a starting material or if hydrogen halide was the agent added to the unsaturated steroid (either $\Delta^4$ or $\Delta^5$), then the product formed after removal of the elements of halogen or hydrohalic acid, as the case may be, is a $\Delta^4$-unsaturated compound.

If, however, the dihalide of a $\Delta^5$-unsaturated steroid was the substance oxidized, after removal of the elements of halogen the product obtained is a $\Delta^5$-unsaturated steroid and it is necessary at some point in the process to convert this into a $\Delta^4$-unsaturated steroid. This is done by adding and then removing the elements of hydrohalic acid.

This shifting of the double bond from $\Delta^5$ to $\Delta^4$ in the oxidation products may be carried out at any stage after the unreacted starting material has been removed from the oxidation products but it must, of course, be done before the steroid is again oxidized to form the 3-keto steroid as set forth later in the specification.

The mixture of oxidation products is conveniently worked up by first separating the acidic and the non-acidic fractions according to methods well known in the art. The non-acidic fraction thus obtained is further treated to isolate the ketonic fraction and from the ketonic fraction the 17-keto-androstane compound and the 20-keto-pregnane compound are isolated. Then the 17-keto-androstane compound, if it still has the double bond in the $\Delta^5$-position, may be converted into the corresponding $\Delta^4$-androstenone-17.

The $\Delta^4$-androstenone-17 thus obtained may be oxidized according to our new method to form $\Delta^4$-androstendione-3,17 and the latter selectively reduced to form $\Delta^4$-androstenol-17-one-3 (testosterone). Otherwise the $\Delta^4$-androstenone-17 may first be selectively reduced under conditions which leave a double bond unaltered so as to form $\Delta^4$-androstenol-17, the hydroxyl group of the latter protected by conversion into a derivative hydrolyzable to regenerate $\Delta^4$-androstenol-17 and this derivative oxidized according to our new method to form the corresponding derivative of $\Delta^4$-androstenol-17-one-3.

In either case the process involves the use of our new method for the preparation of $\Delta^4$-unsaturated 3-keto steroids from $\Delta^4$-unsaturated steroids. This method consists in oxidizing to a ketone group a methylene group adjacent to a double bond and this oxidation is effected by first protecting any hydroxyl groups by converting these into derivatives such as acetates, benzoates, trityl ethers or other groups hydrolyzable to give OH and oxidizing the derivatives thus obtained with an agent capable of converting into a ketone group a methylene group adjacent to a double bond. Such agents include chromic acid and permanganic acid and their salts, as well as selenium dioxide. The conditions of reaction depend on the particular oxidizing agent employed, e. g. we prefer to use chromic acid in acetic acid at 30–60° C.

The selective reduction of $\Delta^4$-androstenone-17 may be accomplished with a wide variety of reducing agents. These include catalytic hydrogenation with a Raney nickel catalyst, and the combination of an alkali or alkaline earth metal or aluminum and a substance having reactive hydrogen atoms. Reducing agents of the latter class include such combinations as sodium and ethyl alcohol, aluminum amalgam and aqueous ammonium chloride, calcium and methanol, and the like. Instead of these the reduction may be conducted according to the method of Meerwein and Ponndorff using, for example, ammonium isopropylate and isopropyl alcohol.

Our invention may be more fully illustrated by the following examples.

*Example 1*

(a) In a 12 liter flask is placed 230 g. of $\Delta^5$-cholestene dibromide prepared, e. g., according to Mauthner, Monatsh. 27, 421 (1906), and 500 cc. of carbon tetrachloride. When solution is complete, 8 liters of glacial acetic acid are added and the solution warmed to 45° C. with stirring. To this stirred solution at 48–50° C. is added dropwise a stirred solution of 320 g. of chromic anhydride in 350 cc. of water and 800 cc. of acetic acid over a period of four or five hours. The solution is stirred at 50° C. for six hours longer and then cooled with cold water or ice to 30° C. Then ethyl alcohol (250 cc.) is added slowly to this stirred solution over a period of about one-half hour to destroy any excess chromic anhydride. The acetic acid is then removed under reduced pressure until the volume of the solution has been reduced about one-half. During the evaporation the temperature of the solution is kept at 40–45° C. The solution is cooled slightly and the unchanged dibromide filtered off and dried. The filtrate is further concentrated under reduced pressure at 40° C. until only a small quantity of acetic acid remains. This residue is diluted with 4 liters of water and 2.5 liters of ether and stirred until all the material is in solution. The water layer is separated and extracted with 2.5 liters of ether. The combined ethereal extracts are washed well with 2 liters of water, 3 liters of water containing 300 cc. of conc. hydrochloric acid, and then twice with 1.5 liters of salt water, sufficient salt being added to cause rapid separation of the layers. The ethereal solution then is evaporated to dryness, the last ether being taken off cautiously to avoid undue heat. The residue contains the dibromides of $\Delta^5$-androstenone-17, $\Delta^5$-pregnenone-20, and $\Delta^5$-cholenic acid.

Instead of using $\Delta^5$-cholestene dibromide in the above step, $\Delta^5$-cholestene dichloride, $\Delta^5$-sitostene dibromide, $\Delta^5$-sitostene dichloride, or other dihalides of $\Delta^5$-unsaturated hydrocarbons derived from sterols may be used instead.

(b) One liter of acetic acid and 5 g. of zinc dust is added to this residue and the solution stirred vigorously and heated to 95° C. on the steam bath. A further 45 g. of zinc dust is added to this stirred solution in small portions over a period of forty-five minutes. Then the solution is filtered from the caked zinc and the latter washed well with acetic acid. The acetic acid filtrate is evaporated to dryness in vacuo on the steam bath and the residue dissolved in 2 liters of ether. The ethereal solution is washed twice with water and the acid fraction is extracted with 5% sodium hydroxide solution until all acids are removed.

*Example 2*

(a) $\Delta^5$-Cholestene, prepared, e. g., by the reduction of cholesteryl chloride with sodium and alcohol, is converted into 5-chlorocholestane by adding hydrogen chloride as described by Mauthner, Monatsh. 28, 1113 (1907).

(b) Two hundred grams of 5-chlorocholestane in 500 cc. of carbon tetrachloride and 4 l. of acetic acid are stirred and maintained at 50° C. while a solution of 150 g. of calcium permanganate in 600 cc. of water, 100 cc. of sulfuric acid, and 2 l. of acetic acid is added over a period of four hours. The mixture is stirred four hours more at 50° C. and then sulfur dioxide passed into the solution with cooling. The mixture is concentrated to one-third its former volume in vacuo, 700 g. of sodium acetate added, and the mixture refluxed for two hours. It is diluted with water and well extracted with ether. The ethereal layer is shaken with 10% sodium hydroxide and the sparingly soluble sodium salt which forms is removed by filtration. The filtrate, consisting of an ethereal and an aqueous phase, is set aside for later treatment as described under (d) below.

(c) The sparingly soluble sodium salt is suspended in water, and the suspension acidified strongly. This mixture is well extracted with ether and the latter washed and evaporated. The residue is crystallized from slightly diluted acetic acid and thus yields $\Delta^4$-cholenic acid of M. P. 160° C.

(d) The ethereal layer in the filtrate is separated and washed well with sodium hydroxide solution and water. After removing the ether on a steam bath, the residue is heated with 200 cc. of acetone, some methanol added, and the mixture chilled. The crude $\Delta^4$-cholestene which separates is collected and recrystallized. The combined mother liquors are evaporated to dryness, and the ketonic constituents removed in the known manner with Girard's reagent T. The crude ketone mixture is distilled slowly in a high vacuum and a fraction collected at 70–110° C. This is fractionally crystallized from dilute methanol and thus yields $\Delta^4$-androstenone-17 of M. P. 78–80° C.

(e) The combined mother liquors from the above described crystallization of $\Delta^4$-androstenone-17 contains $\Delta^4$-androstenone-17 and $\Delta^4$-pregnenone-20, and are evaporated to dryness and dissolved in 50 cc. of acetic acid. To this solution, at 45° C. there is added a solution of 1.5 g. of chromic anhydride in 20 cc. of 90% acetic acid over a period of a half hour. The mixture is poured into water, extracted with ether, and the ethereal extract washed with sodium hydroxide solution and water. The ethereal solution is dried over magnesium sulfate, evaporated to a small volume, and rendered cloudy by the addition of ligroin. On standing, crystals of $\Delta^4$-androstenedione-3,17 separate. After recrystallization, this product melts at 170°. The mother liquor from the separation of the $\Delta^4$-androstenedione-3,17 is made slightly turbid with ligroin and filtered through a column of alumina. The filtrate is evaporated and yields, after crystallization from dilute acetone, progesterone of M. P. 122° C.

*Example 3*

(a) $\Delta^4$-Pregnenone-20, M. P. 105° C. may be isolated from the mother liquors of the preparation of $\Delta^4$-androstenone-17 as in Example 2 (d), or it may be prepared from $\Delta^5$-pregnenol-3-$\beta$-one-20 by the steps of treatment with phosphorus pentachloride to obtain $\Delta^5$-3-chloro-pregnenone-20, treating this with sodium and amyl alcohol to obtain $\Delta^5$-pregnenol-20-$\alpha$, and treating this, to obtain $\Delta^4$-pregnenone-20 in the same manner as described in Serial No. 362,836 for the preparation of $\Delta^4$-androstenone-17 from $\Delta^5$-androsterol-17.

(b) To a solution of 2 g. of $\Delta^4$-pregnenone-20 in 30 cc. of acetic acid at 45° C. is added over a period of an hour, a solution of 2 g. of chromic anhydride in 50 cc. of acetic acid. After standing two hours, sulfur dioxide is passed into the solution to destroy the excess chromic anhydride, and then the mixture is evaporated in vacuo. The residual sirup is dissolved in ether, shaken out with 5% sodium hydroxide and water, and the ethereal extract evaporated. The residue is sublimed in a high vacuum and then crystallized from dilute acetone and thus gives progesterone melting at 120° C.

The above examples are intended to illustrate but not to limit the scope of our invention. Other modes of employing our process apparent to those skilled in the art after this disclosure, are intended to fall within the scope of our invention and accordingly we wish to limit the scope of our invention only as indicated in the appended claims.

What we claim as our invention is:

1. Process for producing progesterone, comprising treating $\Delta^4$-pregenone-20 with chromic anhydride, removing the excess chromic anhydride and removing progesterone from the mixture.

2. Process for producing progesterone comprising treating $\Delta^4$-pregenone-20 with an oxidizing agent of the class consisting of chromic acid, permanganic acid, the salts of said acids and selenium dioxide thereby introducing a keto group in position-3 and forming progesterone, and removing the progesterone.

3. Process for producing progesterone comprising treating $\Delta^4$-pregnenone-20 with chromic anhydride in acetic acid at a temperature of 30–60° C., and removing progesterone.

4. Process for producing progesterone comprising treating a solution containing $\Delta^4$-androstenone-17 and $\Delta^4$-pregnenone-20, with an oxidizing agent of the class consisting of chromic acid, permanganic acid, the salts of said acids and selenium dioxide thereby obtaining $\Delta^4$-androstendione-3,17 and $\Delta^4$-pregnendione-3,20 and separating $\Delta^4$-pregnendione-3,20 therefrom.

5. Process for producing progesterone comprising treating a solution containing $\Delta^4$-androstenone-17 and $\Delta^4$-pregenone-20, with an oxidizing agent of the class consisting of chromic acid, permanganic acid, the salts of said acids and selenium dioxide thereby obtaining a mixture of $\Delta^4$-androstendione-3,17 and $\Delta^4$-pregnendione-3,20, adding water to the mixture, extracting with ether, crystallizing $\Delta^4$-androstendione-3,17 and subsequently crystallizing from the mother liquor $\Delta^4$-pregnendione-3,20.

6. Process for producing progesterone comprising treating a solution containing $\Delta^4$-androstenone-17 and $\Delta^4$-pregnenone-20 with chromic anhydride in acetic acid at a temperature of 30–60° C. thereby obtaining $\Delta^4$-androstendione-3,17 and $\Delta^4$-pregnendione-3,20 and separating $\Delta^4$-pregnendione-3,20 therefrom.

RUSSELL EARL MARKER.
EUGENE L. WITTLE.